(12) United States Patent
Tseng et al.

(10) Patent No.: US 9,047,695 B2
(45) Date of Patent: Jun. 2, 2015

(54) TRANSFORMATION METHOD FOR DIFFUSION SPECTRUM IMAGING USING LARGE DEFORMATION DIFFEOMORPHIC METRIC MAPPING

(71) Applicants: Isaac Wen-Yih Tseng, Taipei (TW); Yung-Chin Hsu, Taipei (TW)

(72) Inventors: Isaac Wen-Yih Tseng, Taipei (TW); Yung-Chin Hsu, Taipei (TW)

(73) Assignee: National Taiwan University, Taipei (TW)

( * ) Notice: Subject to any disclaimer, the term of this patent is extended or adjusted under 35 U.S.C. 154(b) by 289 days.

(21) Appl. No.: 13/644,211

(22) Filed: Oct. 3, 2012

(65) Prior Publication Data
US 2014/0044332 A1  Feb. 13, 2014

(30) Foreign Application Priority Data

Aug. 10, 2012  (TW) .............................. 101129000 A

(51) Int. Cl.
G06K 9/00     (2006.01)
G06T 11/00    (2006.01)
G06T 7/00     (2006.01)

(52) U.S. Cl.
CPC ............. *G06T 11/003* (2013.01); *G06T 7/0014* (2013.01); *G06T 7/003* (2013.01); *G06T 7/0044* (2013.01); *G06T 2207/10088* (2013.01); *G06T 2207/20076* (2013.01); *G06T 2207/30016* (2013.01)

(58) Field of Classification Search
None
See application file for complete search history.

(56) References Cited

U.S. PATENT DOCUMENTS

| | | | | |
|---|---|---|---|---|
| 4,292,124 A * | 9/1981 | Fisch | | 376/132 |
| 6,549,803 B1 * | 4/2003 | Raghavan et al. | | 600/431 |
| 6,940,664 B1 * | 9/2005 | Pilu | | 359/806 |
| 7,230,429 B1 * | 6/2007 | Huang et al. | | 324/322 |
| 7,423,430 B1 * | 9/2008 | Sharif et al. | | 324/309 |
| 7,505,806 B2 * | 3/2009 | Masutani et al. | | 600/410 |
| 7,689,017 B2 * | 3/2010 | Karl et al. | | 382/128 |
| 7,970,194 B2 * | 6/2011 | Kimura | | 382/131 |
| 8,031,927 B2 * | 10/2011 | Karl et al. | | 382/131 |
| 8,094,904 B2 * | 1/2012 | Slabaugh et al. | | 382/130 |
| 8,111,893 B2 * | 2/2012 | Chen et al. | | 382/131 |
| 8,170,305 B2 * | 5/2012 | Laidlaw et al. | | 382/128 |
| 8,170,644 B2 * | 5/2012 | Du | | 600/416 |
| 8,502,534 B2 * | 8/2013 | Lai et al. | | 324/309 |
| 8,577,112 B2 * | 11/2013 | Mori et al. | | 382/131 |
| 2002/0042569 A1 * | 4/2002 | Wedeen | | 600/411 |
| 2004/0120565 A1 * | 6/2004 | Wollenweber | | 382/131 |
| 2004/0161141 A1 * | 8/2004 | Dewaele | | 382/132 |
| 2004/0197015 A1 * | 10/2004 | Fan et al. | | 382/128 |

(Continued)

OTHER PUBLICATIONS

Google Scholar NPL Search—Sep. 5, 2014, pp. 1-2.*

(Continued)

*Primary Examiner* — Chan Park
*Assistant Examiner* — Mia M Thomas
(74) *Attorney, Agent, or Firm* — Occhiuti & Rohlicek LLP

(57) ABSTRACT

A transformation method for diffusion spectrum imaging includes: receiving an original DSI dataset and a template DSI dataset; computing an energy function; computing, for each time point, first-order and second-order derivatives of the energy function with respect to velocity fields in an image space and in a q-space; computing, for each time point, the velocity fields in the image space and in the q-space based upon the first-order and second-order derivatives; performing integration on the velocity fields over time to obtain a deformation field; and generating a transformed DSI dataset according to the deformation field.

6 Claims, 3 Drawing Sheets

(56) References Cited

U.S. PATENT DOCUMENTS

| | | | |
|---|---|---|---|
| 2006/0094951 A1* | 5/2006 | Dean et al. | 600/407 |
| 2006/0158447 A1* | 7/2006 | McGraw et al. | 345/419 |
| 2007/0014457 A1* | 1/2007 | Jolly et al. | 382/128 |
| 2007/0092120 A1* | 4/2007 | Guo et al. | 382/128 |
| 2007/0092122 A1* | 4/2007 | Xiao et al. | 382/128 |
| 2007/0265518 A1* | 11/2007 | Boese et al. | 600/407 |
| 2008/0051648 A1* | 2/2008 | Suri et al. | 600/407 |
| 2008/0118132 A1* | 5/2008 | Ubelhart et al. | 382/131 |
| 2008/0247622 A1* | 10/2008 | Aylward et al. | 382/131 |
| 2008/0278804 A1* | 11/2008 | Gharib et al. | 359/462 |
| 2008/0292163 A1* | 11/2008 | DiBella et al. | 382/131 |
| 2009/0003655 A1* | 1/2009 | Wollenweber | 382/107 |
| 2009/0041188 A1* | 2/2009 | Keall et al. | 378/65 |
| 2009/0074276 A1* | 3/2009 | Doi et al. | 382/130 |
| 2009/0096454 A1* | 4/2009 | Reisman | 324/320 |
| 2009/0284257 A1* | 11/2009 | Bammer et al. | 324/307 |
| 2009/0299154 A1* | 12/2009 | Segman | 600/301 |
| 2009/0304248 A1* | 12/2009 | Zalis et al. | 382/131 |
| 2010/0004526 A1* | 1/2010 | Wei et al. | 600/407 |
| 2010/0056897 A1* | 3/2010 | Zhang | 600/407 |
| 2010/0127703 A1* | 5/2010 | Sung et al. | 324/309 |
| 2010/0239141 A1* | 9/2010 | Rouet et al. | 382/131 |
| 2010/0239144 A1* | 9/2010 | Fichtinger et al. | 382/131 |
| 2010/0284595 A1 | 11/2010 | Mori et al. | |
| 2010/0308821 A1* | 12/2010 | Poupon et al. | 324/309 |
| 2011/0092794 A1* | 4/2011 | Miller et al. | 600/407 |
| 2011/0103672 A1* | 5/2011 | Miller et al. | 382/131 |
| 2011/0142316 A1* | 6/2011 | Wang et al. | 382/131 |
| 2011/0245650 A1* | 10/2011 | Kerwin et al. | 600/407 |
| 2011/0274330 A1* | 11/2011 | Mori et al. | 382/131 |
| 2012/0078085 A1* | 3/2012 | Xue et al. | 600/420 |
| 2013/0030757 A1* | 1/2013 | Stotzka et al. | 702/156 |
| 2013/0182932 A1* | 7/2013 | Chen et al. | 382/131 |
| 2013/0195335 A1* | 8/2013 | Gorman et al. | 382/131 |
| 2013/0231548 A1* | 9/2013 | Brown et al. | 600/407 |
| 2013/0259340 A1* | 10/2013 | Tseng et al. | 382/131 |

OTHER PUBLICATIONS

Leventon et al. "Statistical Shape Influence in Geodesic Active Contours" Computer Vision and Pattern Recognition, Jun. 2000, pp. 1-8 IEEE.*

Zhukov et al. "Heart-Muscle Fiber Reconstruction from Diffusion Tensor MRI" IEEE Visualization 2003, Oct. 19-24, 2003, Seattle, Washington, USA.*

Ashburner, John. "A fast diffeomorphic image registration algorithm" NeuroImage 38 (2007) 95-113.*

Chumchob et al. "A Robust Affine Image Registration Method" International Journal Of Numerical Analysis and Modeling, vol. 6, No. 2, pp. 1-24.*

Pannek et al. "HOMOR: Higher Order Model Outlier Rejection for high b-value MR diffusion data" Neuroimage 63 (2012) pp. 1-8 (835-842).*

Christensen et al. "Consistent Image Registration" IEEE Transactions On Medical Imaging, vol. 20, No. 7, Jul. 2001, pp. 1-15.*

* cited by examiner

TRANSFORMATION METHOD FOR DIFFUSION SPECTRUM IMAGING USING LARGE DEFORMATION DIFFEOMORPHIC METRIC MAPPING

CROSS-REFERENCE TO RELATED APPLICATION

This application claims priority to Taiwanese Application No. 101129000, filed on Aug. 10, 2012.

BACKGROUND OF THE INVENTION

1. Field of the Invention

The invention relates to an image processing method, and more particularly to an image processing method for magnetic resonance imaging.

2. Description of the Related Art

Diffusion MRI is a non-invasive imaging method suitable for evaluating fiber orientation of a specific region and revealing the underlying white matter structure of the human brain. One of the approaches is the diffusion tensor imaging (DTI), where the water diffusion is modelled as Gaussian distribution. Practically, a DTI dataset consists of six diffusion weighted (DW) images by applying the diffusion-sensitive gradients in six non-colinear directions, and one null image with no application of diffusion-sensitive gradient. The water diffusion is encoded in the signal intensity of the DW images. Therefore, with appropriate processing on the signal intensity of the DTI dataset, the diffusion tensor in each voxel can be estimated. The diffusion tensor could be represented by a symmetric 3-by-3 matrix, where the principal eigenvector of the matrix is usually assumed to coincide with the underlying fiber orientation. The fiber orientation map can be further processed to reconstruct the fiber pathways.

However, the Gaussian assumption limits DTI to detect at most one fiber orientation in each voxel. Consequently, in regions with crossing fibers, it is difficult for DTI to resolve the fiber orientations and would lead to inaccurate estimation of the anisotropy index.

The crossing fiber problem could be resolved through estimating the diffusion orientation distribution function (ODF). The diffusion ODF could be estimated by the high angular resolution diffusion image (HARDI) methods, such as q-ball imaging (QBI), or by a grid sampling scheme, which is also called diffusion spectrum imaging (DSI). All of the methods do not impose any diffusion models.

In neuroimage studies, it is usually required to transform the brain images to a common space, the so-called template space, to perform the analyses (e.g., statistical comparisons between healthy and patient groups). It is known in the art to use a linear or non-linear method to transform a three-dimensional (3D) brain image to the template space. However, the conventional 3D transformation methods can only deal with scalar images. For an appropriate transformation on diffusion images such as DTI, QBI or DSI, not only the anatomical structures need to be registered, but the diffusion profiles require to be aligned.

SUMMARY OF THE INVENTION

Therefore, an object of the present invention is to provide a transformation method that may completely transform image spatial information and diffusion information for diffusion spectrum imaging (DSI) datasets.

According to the present invention, a transformation method for DSI comprises:

a) receiving an original DSI dataset and a template DSI dataset;

b) using a processor to compute an energy function E;

c) using the processor to obtain, for each time point, a first-order derivative and a second-order derivative of the energy function E computed in step b) with respect to velocity field in an image space and a first-order derivative and a second-order derivative of the energy function E computed in step b) with respect to velocity field in a q-space;

d) using the processor to compute, for each time point, the velocity field in the image space and the velocity field in the q-space based upon the first-order and second-order derivatives obtained in step c);

e) using the processor to perform integration on the velocity fields obtained in step d) over time to obtain a deformation field, which maps the original DSI dataset to the template DSI dataset; and f) using the processor to generate a transformed DSI dataset according to the deformation field obtained in step e).

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
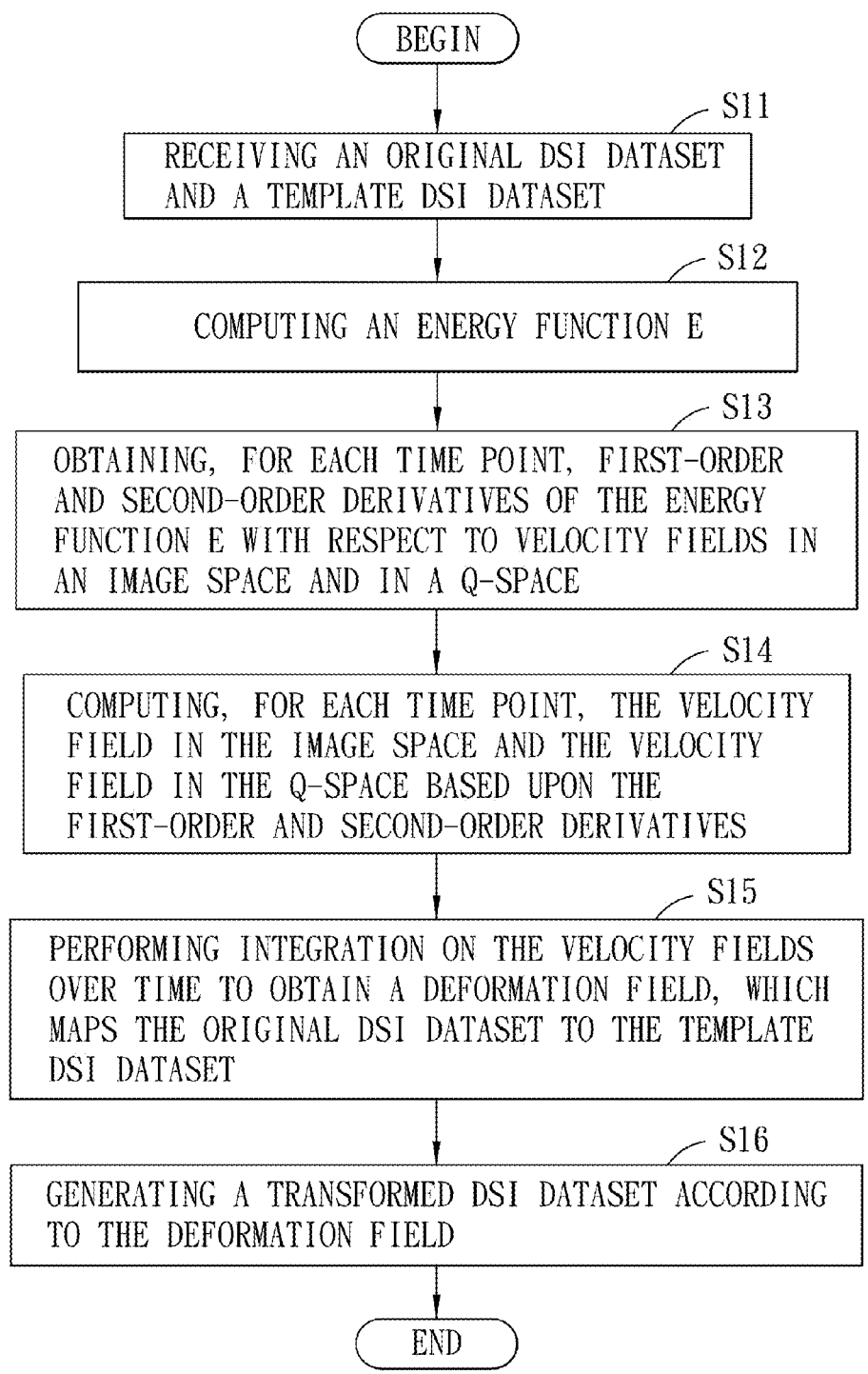
FIG. 1 is a flow chart illustrating steps of a preferred embodiment of the transformation method for diffusion spectrum imaging (DSI) according to the present invention.
Figure 2:
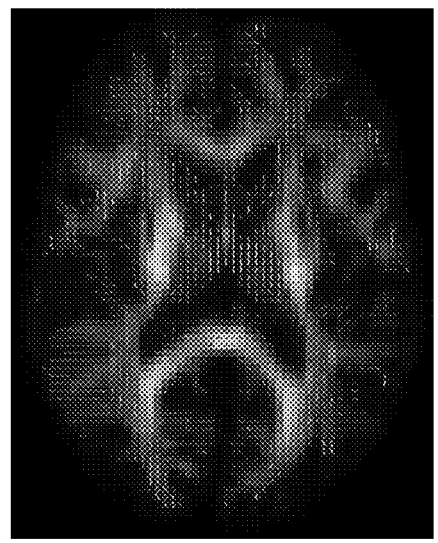
FIG. 2 is an image of an original DSI of an example.
Figure 3:
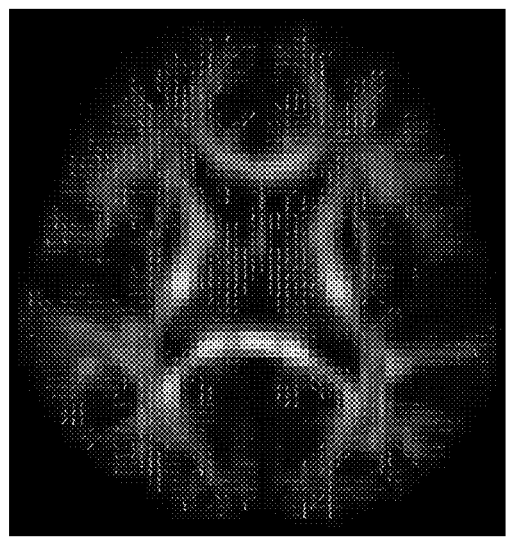
FIG. 3 is an image of the template DSI of the example.

Referring to FIG. 1, the preferred embodiment of the transformation method for diffusion spectrum imaging (DSI) according to this invention is implemented by a processor of a computer after the computer loads a proprietary program stored in a storage medium. The transformation method comprises the following steps:

Step S11: Receiving an original DSI dataset (such as the image shown in FIG. 2) and a template DSI dataset (such as the image shown in FIG. 3). A DSI image set often includes hundreds of images, and FIGS. 2 and 3 are obtained by summarizing the hundreds of the images to a generalized fractional anisotropy (GFA) map.

Step 12: Using a processor of the computer to compute an energy function E, which is:

$$E = E_1 + E_2 = \underbrace{\frac{1}{2}\int_0^1 \|v_t\|^2 dt}_{E_1} + \underbrace{\frac{1}{2\sigma^2}\int ((WI_0)\cdot g_{10} - WI_1)^2 dq dx}_{E_2} \quad (1)$$

where $E_1$ is an energy of the transformation path, $E_2$ is an energy representing data-matching, x is a three-dimensional coordinate in an image space, and q is a three-dimensional coordinate in a q-space. $v_t$ is velocity field at time t, $\sigma$ is a parameter controlling the relative contribution between $E_1$ and $E_2$, W is a predetermined weighting function, $I_0$ is the template DSI dataset, and $I_1$ is the original DSI dataset. The interpretation of $g_{ab}$ is that for a particle located at (x,q) at time t=a, $g_{ab}$(x,q) is a position of the particle at time t=b. Thus, $g_{10}$ could be considered as a deformation mapping function of $WI_0$ when t=1. The weighting function W(q) is to compensate low signal intensity in regions with high |q| values.

Step 13: Using the processor to obtain, for each time point, a first-order derivative and a second-order derivative of the energy function E computed in step 12 with respect to velocity field in the image space and a first-order derivative and a second-order derivative of the energy function E computed in step 12 with respect to velocity field in the q-space.

A large deformation diffeomorphic metric mapping (LDDMM), which is proposed by Beg, M. F. et al. in 2005, is used in this preferred embodiment. The transformation process is assumed to behave like liquid flow, so that there is an associated velocity field at each time point. In other words, the velocity field is a function of time.

In this embodiment, the first-order derivative of the energy function E with respect to the velocity field in the image space is computed using the following equation (2):

$$\frac{\partial E}{\partial v_{x,t}} = v_{x,t} - K\left[\frac{1}{\sigma^2}\int |Dg_{t,1}|\nabla_x J_t^0 (J_t^0 - J_t^1) dq\right] \quad (2)$$

The first-order derivative of the energy function E with respect to the velocity field in the q-space is computed using the following equation (3):

$$\frac{\partial E}{\partial v_{q,t}} = v_{q,t} - K\left[\frac{1}{\sigma^2}|Dg_{t,1}|\nabla_q J_t^0 (J_t^0 - J_t^1)\right] \quad (3)$$

where $v_{x,t}$ is the velocity field in the image space at time t, $v_{q,t}$ is the velocity field in the q-space at time t, K is a smoothing operator characterizing the smoothness of the velocity field, $J_t^0 = (WI_0) \circ g_{t0}$, and $J_t^1 = (WI_1) \circ g_{t1}$.

The second-order derivative of the energy function E with respect to the velocity field in the image space is computed using the following equation (4):

$$\frac{\partial^2 E}{\partial v_{x,t}^2} = K\left[\frac{1}{\sigma^2}\int |Dg_{t,1}|(\nabla_x J_t^0)(\nabla_x J_t^0)^T dq\right] \quad (4)$$

The second-order derivative of the energy function E with respect to the velocity field in the q-space is computed using the following equation (5):

$$\frac{\partial^2 E}{\partial v_{q,t}^2} = K\left[\frac{1}{\sigma^2}|Dg_{t,1}|(\nabla_q J_t^0)(\nabla_q J_t^0)^T\right] \quad (5)$$

Step 14: Using the processor to compute, for each time point, the velocity field in the image space and the velocity field in the q-space based upon the first-order and second-order derivatives obtained in step 13.

In this embodiment, the first-order and second-order derivatives obtained in step 13 are applied to a Levenberg-Marquardt (LM) algorithm to accelerate calculation as in the following equations (6) and (7):

$$v_{x,t}^{(n+1)} = v_{x,t}^{(n)} - K\left[\int \left(\frac{1}{\sigma^2}|Dg_{t,1}|(\nabla_x J_t^0)(\nabla_x J_t^0)^T + \delta I\right)^{-1}\right. \quad (6)$$
$$\left.\left(K^{-1} v_{x,t}^{(n)} - \frac{1}{\sigma^2}|Dg_{t,1}|\nabla_x J_t^0 (J_t^0 - J_t^1)\right) dq\right]$$

$$v_{q,t}^{(n+1)} = v_{q,t}^{(n)} - K\left[\left(\frac{1}{\sigma^2}|Dg_{t,1}|(\nabla_q J_t^0)(\nabla_q J_t^0)^T + \delta I\right)^{-1}\right. \quad (7)$$
$$\left.\left(K^{-1} v_{q,t}^{(n)} - \frac{1}{\sigma^2}|Dg_{t,1}|\nabla_q J_t^0 (J_t^0 - J_t^1)\right)\right]$$

where $K^{-1}$ is an inverse operator of K. Calculation may converge after about 5 iterations (n=5), and the velocity field in the image space and the velocity field in the q-space at time t are thus obtained.

Step 15: Using the processor to perform integration on the velocity fields obtained in step 14 over time to obtain a deformation field which maps the original DSI dataset to the template DSI dataset. The deformation field is obtained according to the following equation (8):

$$\frac{dg_{0t}}{dt} = v_t \circ g_{0t} \quad (8)$$

where $\circ$ denotes function composition. Here the deformation field $g_{0t} = (g_{x,0t}, g_{q,0t})$, where $g_{x,0t}$, which is an image space component of $g_{0t}$, is a function of x, and $g_{q,0t}$, which is a q-space component of $g_{0t}$, is a function of both x and q. Similarly, $v_t = (v_{x,t}, v_{q,t})$, where $v_{x,t}$, which is an image space component of $v_t$, is a function of x, and $v_{q,t}$, which is a q-space component of $v_t$, is a function of both x and q.

Figure 4:
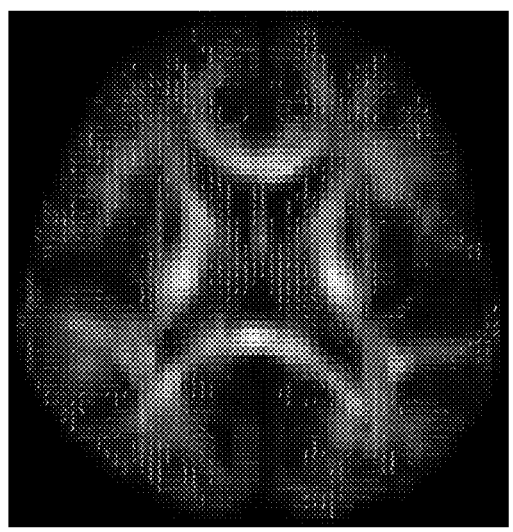
FIG. 4 is an image transformed using the preferred embodiment of the transformation method.

Step 16: Using the processor to generate a transformed DSI dataset according to the deformation field obtained in step 15. The transformed DSI dataset is shown as the image in FIG. 4.

It should be noted that the processors used in each step of this method may be the same or different.

To sum up, the transformation method of this invention uses not only the three-dimensional information in the image space, but also the three-dimensional diffusion information of the DSI dataset, in a total of six dimensions. Therefore, when the original DSI dataset is registered to the template space, details like diffusion information in the image space and in the q-space may be completely transformed, so as to enhance precision of the subsequent comparison and application.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A transformation method for diffusion spectrum imaging (DSI) comprising:
   a) receiving an original DSI dataset and a template DSI dataset;
   b) using a processor to compute an energy function E;
   c) using the processor to obtain, for each time point, a first-order derivative and a second-order derivative of the energy function E computed in step b) with respect to velocity field in an image space and a first-order derivative and a second-order derivative of the energy function E computed in step b) with respect to velocity field in a q-space;

d) using the processor to compute, for each time point, the velocity field in the image space and the velocity field in the q-space based upon the first-order and second-order derivatives obtained in step c);

e) using the processor to perform integration on the velocity fields obtained in step d) overtime to obtain a deformation field, which maps the original DSI dataset to the template DSI dataset, wherein the deformation field is calculated according to:

$$\frac{dg_{0t}}{dt} = v_t \circ g_{0t};$$

and wherein the deformation field $g_{0t}=(g_{x,0t}, g_{q,0t})$, where x is a three-dimensional coordinate in the image space, q is a three-dimensional coordinate in the q-space, $g_{x,0t}$, which is an image space component of $g_{0t}$, is a function of x, and $g_{q,0t}$, which is a q-space component of $g_{0t}$, is a function of both x and q; and the velocity field $v_t=(v_{x,t}, v_{q,t})$ where $v_{x,t}$, which is an image space component of $v_t$, is a function of x, and $v_{q,t}$, which is a q-space component of $v_t$, is a function of both x and q; and f) using the processor to generate a transformed DSI dataset according to the deformation field obtained in step e).

2. The transformation method as claimed in claim 1, wherein, in step d), the velocity field for each time point is calculated using an iterative Levenberg-Marquardt algorithm.

3. The transformation method as claimed in claim 1, wherein, in step b), the energy function is:

$$E = E_1 + E_2 = \underbrace{\frac{1}{2}\int_0^1 \|v_t\|^2 dt}_{E_1} + \underbrace{\frac{1}{2\sigma^2}\int((WI_0)\circ g_{10} - WI_1)^2 dqdx}_{E_2} \quad (1)$$

where $E_1$ is an energy of the transformation path, $E_2$ is an energy representing data-matching, $v_t$ is the velocity field at time t, σ is a parameter controlling the relative contribution between $E_1$ and $E_2$, W is a predetermined weighting function, $I_0$ is the template DSI dataset, $I_1$ is the original DSI dataset, $g_{10}$ is a deformation mapping function of $WI_0$ when t=1, x is a three-dimensional coordinate in the image space, and q is a three-dimensional coordinate in the q-space.

4. A transformation method for diffusion spectrum imaging (DSI) comprising:

a) receiving an original DSI dataset and a template DSI dataset;

b) using a processor to compute an energy function E:

$$E = E_1 + E_2 = \underbrace{\frac{1}{2}\int_0^1 \|v_t\|^2 dt}_{E_1} + \underbrace{\frac{1}{2\sigma^2}\int((WI_0)\circ g_{10} - WI_1)^2 dqdx}_{E_2} \quad (1)$$

where $E_1$ is an energy of the transformation path, $E_2$ is an energy representing data-matching, $v_t$ is the velocity field at time t, σ is a parameter controlling the relative contribution between $E_1$ and $E_2$, W is a predetermined weighting function, $I_0$ is the template DSI dataset, $I_1$ is the original DSI dataset, $g_{10}$ is a deformation mapping function of $WI_0$ when t=1, x is a three-dimensional coordinate in the image space, and q is a three-dimensional coordinate in the q-space;

c) using the processor to obtain, for each time point, a first-order derivative and a second-order derivative of the energy function E computed in step b) with respect to velocity field in an image space and a first-order derivative and a second-order derivative of the energy function E computed in step b) with respect to velocity field in a q-space;

d) using the processor to compute, for each time point, the velocity field in the image space and the velocity field in the q-space based upon the first-order and second-order derivatives obtained in step c);

e) using the processor to perform integration on the velocity fields obtained in step d) overtime to obtain a deformation field, which maps the original DSI dataset to the template DSI dataset;

f) using the processor to generate a transformed DSI dataset according to the deformation field obtained in step e).

5. The transformation method as claimed in claim 4, wherein, in step e), the deformation field is calculated according to:

$$\frac{dg_{0t}}{dt} = v_t \circ g_{0t};$$

where $v_t$ is velocity field at time t, $g_{0t}$ is the deformation field at time t, and ∘ denotes function composition.

6. The transformation method as claimed in claim 4, wherein, in step d), the velocity field for each time point is calculated using an iterative Levenberg-Marquardt algorithm.

* * * * *